United States Patent [19]

McLachlan et al.

[11] Patent Number: 5,024,846
[45] Date of Patent: Jun. 18, 1991

[54] SEPARATION OF STEROLS FROM LIPIDS

[75] Inventors: Corran N. S. McLachlan, 29 Summer Street, Devonport, Auckland; Owen J. Catchpole; Bruce H. Hamilton, both of Wellington, all of New Zealand

[73] Assignee: Carran Norman Stuart McLachlan, Auckland, New Zealand

[21] Appl. No.: 561,477

[22] Filed: Aug. 2, 1990

Related U.S. Application Data

[63] Continuation of Ser. No. 453,072, Dec. 18, 1989, abandoned, which is a continuation of Ser. No. 181,088, Apr. 14, 1988, abandoned.

[30] Foreign Application Priority Data

Aug. 26, 1987 [NZ] New Zealand .......... 221586

[51] Int. Cl.5 .......... C11B 3/06; C11B 3/10; C11B 7/00
[52] U.S. Cl. .......... 426/312; 260/412.8; 260/428.5; 426/317; 426/318; 426/417; 426/424; 426/425; 426/429; 426/478; 426/491
[58] Field of Search .......... 426/312, 317, 318, 417, 426/425, 429, 478, 490, 491, 422, 424; 260/412, 412.6, 412.8, 420, 428, 428.5; 210/674, 690

[56] References Cited

U.S. PATENT DOCUMENTS 4,466,923  8/1984  Friedrich .......... 260/412.8 X
4,504,503  3/1985  Biernoth et al. .......... 426/318 X
4,749,522  6/1988  Kamarei .......... 260/412.8

FOREIGN PATENT DOCUMENTS 0129739  1/1985  European Pat. Off. .......... 260/412.8
134042   6/1981  Japan .......... 426/478
140299   8/1984  Japan .......... 260/428

OTHER PUBLICATIONS

Schwartz et al., "Rapid Quantitative Procedure for Removing Cholesterol from Butter Fat", Journal of Lipid Research, 8:54, 1967; 2601428.5.
Nicolaide, Chem. Abstracts 74(12): 60681K, 1970.
Homberg, Chem. Abstracts 107(16):136267c, 1987.
Traill, Chem. Abstracts 80(3):12158x, 1973.
E. N. Frankel, et al., "Chromatographic Separation of Some Milk Lipids", J. Dairy Science, 41, 483 (1958).
A. Shishikura et al., "Modification of Butter Oil by Extraction with Supercritical Carbon Dioxide", Agric. Biol. Chem., 50(5), 1209-1215, 1986.

Primary Examiner—Arthur L. Corbin
Attorney, Agent, or Firm—Pennie & Edmonds

[57] ABSTRACT

A process for separating sterols from lipids, (e.g. cholesterol from butter fat) using sub or supercritical fluids (such as $CO_2$) by dissolving the sterol/lipid mixture in a high pressure physiologically acceptable fluid (either as a high pressure liquid or as a high pressure sub or supercritical gas), to form a high pressure fluid mixture, and then contacting the high pressure fluid mixture with an adsorbent material chosen from the group consisting of calcium hydroxide, calcium oxide, calcium carbonate, magnesium carbonate and magnesium hydroxide to selectively adsorb sterols on the adsorbent material, and then removing the substantially sterol free lipids from the high pressure fluid.

7 Claims, 2 Drawing Sheets

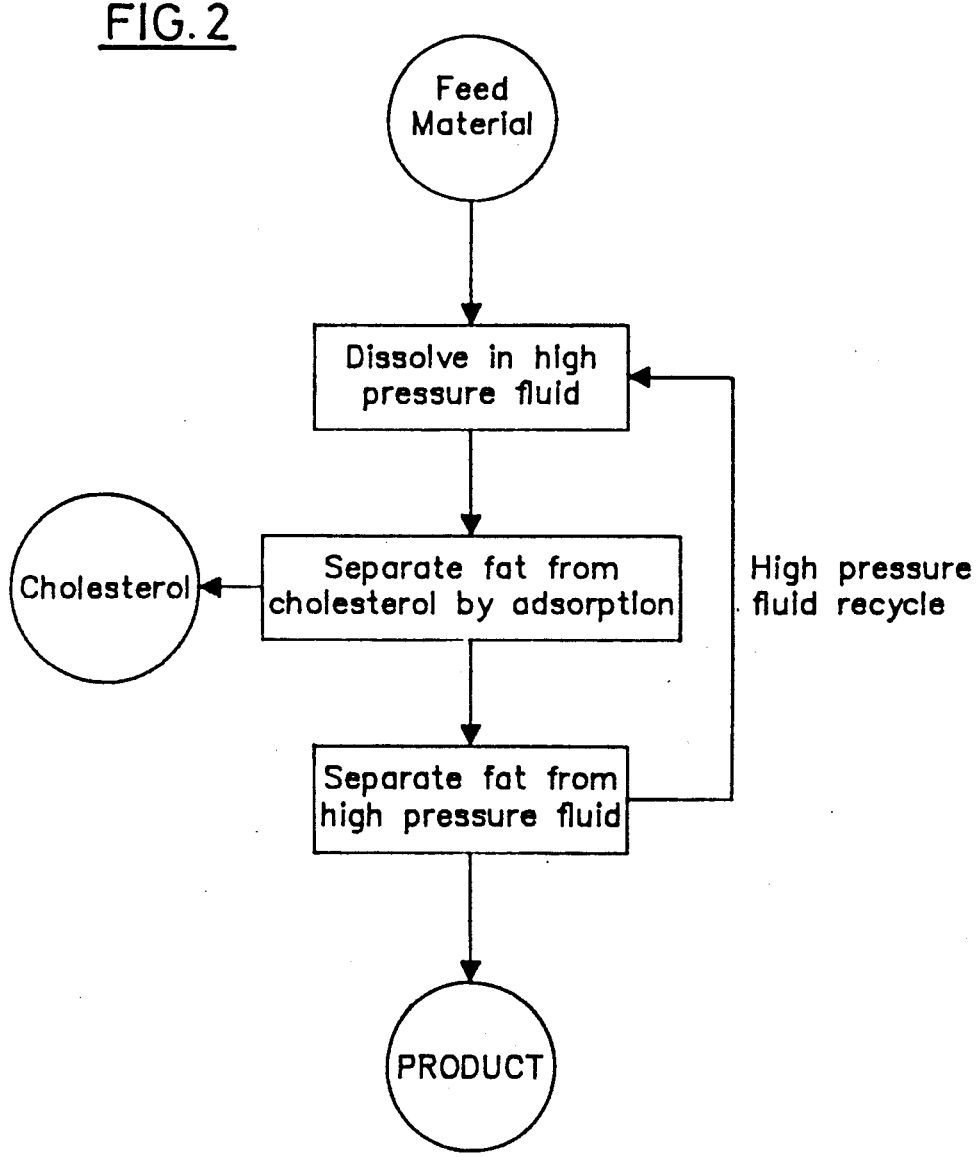

SEPARATION OF STEROLS FROM LIPIDS

This is a continuation of U.S. application Ser. No. 07/453,072, filed Dec. 18, 1989, now abandoned, which is a continuation of U.S. Ser. No. 8,181,088, filed Apr. 14, 1988, now abandoned.

FIELD

This invention relates to the separation of sterols (and in particular cholesterol) from lipids, i.e. from naturally occurring fats or oils. It has particular though not sole application to the preparation of a low cholesterol or cholesterol free butter or tallow.

BACKGROUND

Attempts have been made to modify butter in an attempt to fractionate the triglycerides, in order to produce a more spreadable butter, and/or to remove the cholesterol present in the butter. However, none of these prior art techniques has proved to be satisfactory, as they have either not satisfactorily removed the cholesterol, or in removing the cholesterol have modified the flavouring of the butter or otherwise degraded the butter by altering its physical properties, as well as its keeping properties.

Concern is being increasingly expressed at the level of cholesterol in foodstuffs. In addition to concern over the presence of saturated fats in our diet, it is likely that legislation will be enacted in some countries which will require cholesterol content to be shown along with other nutritional values when the foodstuff is sold.

The primary source of cholesterol in foodstuffs is lipid-containing food such as meat, either red or white, shell-fish, and dairy products such as butter or cheese.

The lipid components of interest are those known as neutral lipids. This class of lipids contains: mono-, di- and tri-acylglycerides, collectively known as fat; free and esterified cholesterol, and other sterols; free fatty acids, fatty alcohols and wax esters. Of most interest are the fat and cholesterol components, and in the case of butter, it is desirable to remove cholesterol from the butter without in any way degrading the fat component.

PRIOR ART

EP 0174848 (A2) in the name of New Zealand Dairy Research Institute, teaches a method of removing cholesterol from anhydrous milk fat at a temperature of 70°–90° C., with the addition of active pulverised carbon, which is stirred into the heated fat for one hour, removed by filtration, and then the heated fat is treated again with pulverised carbon a number of times until the milk fat is cholesterol free or at least substantially free of cholesterol. However, such a treatment degrades the milk fat by heating, results in oxidation and unpleasant odours, requiring the subsequent use of a deodoriser and antioxidants, and degrades or removes the flavouring and colouring components of the milk fat. The milk fat thus requires additional treatment and addition of additives in order to endeavour to simulate its original colour and flavour.

Another approach is mentioned in U.S. Pat. No. 4,504,503 assigned to Lever Brothers Company. In this patent, there is disclosed a process for producing a mixture of triglycerides displaying butter-like properties by fractionating fats with a liquified gas or gas under supercritical conditions. The preferred gas is supercritical $CO_2$ which is used to treat butter fat or hardened butter fat at a temperature of 60°–100° C. and subsequently separated by fractional condensation by varying the pressure or temperature of the $CO_2$ in order to preferentially separate out the different triglycerides. This results in the preferential separation of a mixture of triglycerides having a carbon number of 24–42, suitable for use in the manufacture of margarine. No mention is made of the removal of cholesterol.

In Japanese Patent 134042 by Shishikura et al., and in their related paper entitled "Modification of Butter Oil by Extraction with Supercritical $CO_2$" Agric. Biol. Chem., 50(5), 1209-1215, 1986, A. Shishikura, et al. concluded that the preparation of a low cholesterol butter oil by simple extraction with supercritical $CO_2$ is impractical. In that paper, there is described an attempt at modifying butter oil by dissolving the butter oil in the supercritical $CO_2$ at 40° C. and 300 to 350 bar, and passing the supercritical fluid through a column of Silicic Acid.

A. Shishikura, et al. reported they could achieve significant (over 90%) reduction of cholesterol but only at the expense of very high yield losses (up to 50%). Under conditions where yield loss was reasonable (15%–20%) cholesterol yields fell to 70%–80%. Experiments were also undertaken with mixtures of activated carbon and silicic acid. This resulted in cholesterol removal of above 75% but both flavour and colour constituents were almost entirely removed.

OBJECT

It is an object of the present invention to provide an improved process for separating sterols from lipids, and in particular an improved process for separating cholesterol from butter.

SUMMARY OF THE INVENTION

Surprisingly, we have found that it is possible to separate sterols, and in particular cholesterol, from fats by dissolving the cholesterol/fat mixture in a high pressure liquid or sub or supercritical gas such as $CO_2$, and to selectively adsorb the cholesterol from the dissolved fat mixture by contacting the high pressure fluid mixture with an adsorbant which is made up from or includes the oxygen containing salts of the basic metals such as the oxides, hydroxides, carbonates, sulphates, or the like.

We prefer to pass the high pressure fluid mixture through a bed or column of the basic adsorbant material to allow the cholesterol to be selectively adsorbed by the material, so that the high pressure fluid leaving the bed contains a fat product which is substantially free of cholesterol.

Accordingly, in one aspect, the invention provides a method of separating sterols from lipids, including: (a) dissolving the sterol/lipid mixture in a high pressure physiologically acceptable fluid (either as a high pressure liquid or as a high pressure sub or supercritical gas), and (b) contacting the high pressure fluid mixture with an adsorbant material which is made up from or includes the oxygen containing salts of the basic metals such as the oxides, hydroxides, carbonates, sulphates, or the like, to selectively adsorb the sterols on the adsorbant material, and (c) removing the substantially sterol free lipids from the high pressure fluid.

Preferably, the cholesterol or other sterols can be selectively removed from the adsorbant material by stripping the adsorbant material using the same, or another high pressure fluid, or by using organic solvents, such as propan-2-ol, and chloroform/methanol mixtures for example. By this means, it is possible to selectively refine cholesterol or other sterols for pharmaceutical or other purposes.

DRAWINGS

The above gives a broad description of the present invention, a preferred form of which will now be described by way of example only with reference to the accompanying drawings in which:

FIG. 2 is a flow chart showing a similar process where the feed material is a fat or oil such as butter, plant oil, or fish oil, which is dissolved in the high pressure fluid, and the cholesterol is selectively removed therefrom by adsorption on an adsorbant material, and the substantially cholesterol free fat or oil is condensed from the high pressure fluid.

Figure 1:
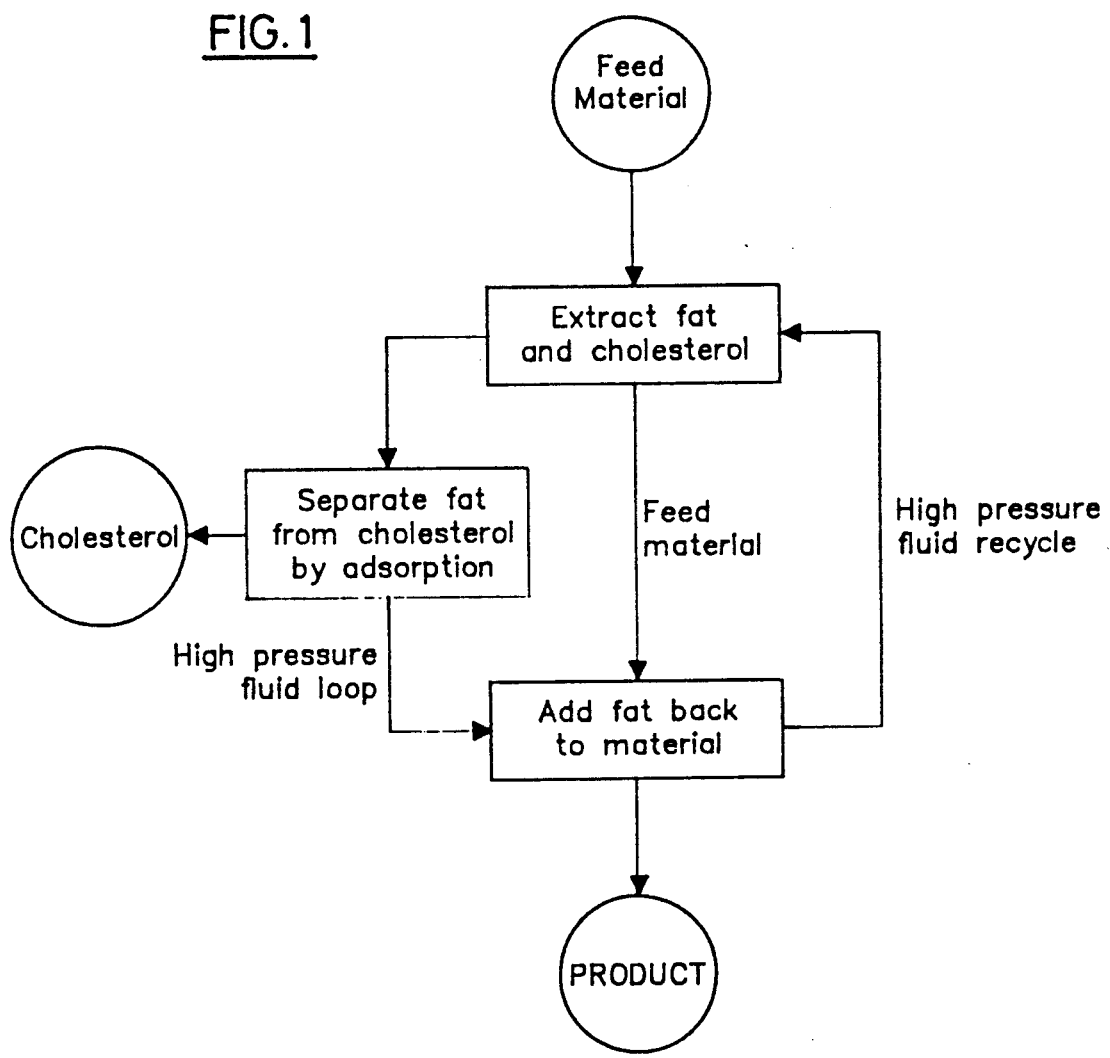
FIG. 1 is a flow chart showing the extraction of fat and cholesterol from a cholesterol containing feed material such as meat, egg powder, or milk powder using a high pressure fluid and separating the cholesterol from the cholesterol/fat mixture by selective adsorption of the cholesterol on an adsorbant material.

In these two processes, a high pressure fluid is used either to dissolve the fat or oil, where the feed stock is butter, or an animal or plant oil; or where the feedstock is a matrix containing fats and cholesterol, e.g. meat, cheese, milk fats, egg powder, or the like, the fat and cholesterol can be extracted using the high pressure fluid.

Suitable extraction fluids include:

$CO_2$, $N_2O$, $CF_3Cl$, $CF_2Cl_2$, $CH_2CF_2$, $SF_6$, $CHF_3$, $CHF_2Cl$, $CF_3Cl$, $CF_2CH_2$, $C_3F_8$, ethane, ethylene, or mixtures thereof, and other gases unobjectionable from a health point of view, and which will be sub or supercritical in temperature and pressure ranges suitable for the processing of foodstuffs. Entrainers (as discussed below) can also be used in conjunction with the high pressure fluid. The high pressure fluid can be a liquid, or can be a sub or supercritical gas.

In a high pressure fluid extraction process, pressure and temperature are the controlling parameters. A substance is in the supercritical state when it is above its critical temperature, $T_c$, and pressure, $P_c$. In this state, it can no longer be compressed into a liquid, for any pressure.

For $CO_2$, $T_c = 31.3°$ C., and $P_c = 72.8$ Bar. A subcritical fluid is a fluid with a pressure greater than $P_c$, but with a temperature less than $T_c$. Both sub and supercritical fluids can be used for extraction purposes.

Suitable extraction Pressures: 50-400 Bar (preferably 200-250 Bar).

Suitable extraction Temperatures: 30°-60° C. (preferably 35° C.).

Of the options available, the preferred extraction pressures are in the range 200-300 bar, and temperatures in the range 30°-50° C., using $CO_2$ as the extracting agent. Temperatures above 60° C. preferably should not be used where the cholesterol is extracted from a protein containing source so as to avoid protein denaturisation. $CO_2$ was chosen as our preferred extractant because it is physiologically inert, it has bacteriostatic/bacteriocidal properties, has relatively low critical temperature and pressure requirements, is particularly suited to treating food products, and is compatible with our preferred adsorbant materials.

Our preferred processes are concerned with the application of adsorption techniques to cholesterol and other sterols when dissolved in a high pressure fluid.

Cholesterol or other sterols are separated by selective adsorption from a mixture of neutral lipids (mainly triacylglycerides) of natural origin, i.e. from animals, plants, yeasts or the like. The feed mixture can be obtained in the following ways:

(1) By extraction from a solid matrix such as meat, egg powders, milk powders, and other animal products containing a certain amount of cholesterol containing fats.

(2) By extraction of liquid or solid purified animal fats, such as lard, butter, fish oils, wool grease, plant oils, or the like.

The lipid mixture is extracted or dissolved into a high pressure (liquid or sub or supercritical) fluids.

Separation of cholesterol or other sterols (as discussed below) from the dissolved lipid mixture, is achieved by contacting the high pressure fluid mixture with an adsorbant which is made from or contains the oxygen containing salts of the basic metals such as the oxides, hydroxides, carbonates, sulphates, or the like. The oxygen containing salts may include (but are not limited to): oxides, hydroxides, carbonates, sulphates, phosphates, acetates, or carboxylates. A wide range of basic metal oxides, hydroxides, carbonates, sulphates and other oxygen containing salts can be used and these include magnesium oxide, calcium oxide, strontium oxide, barium oxide, cadmium$^{II}$ oxide, cobalt$^{II}$ oxide, manganese oxide, nickel oxide, zinc oxide, and the hydroxides, carbonates, sulphates and other oxygen containing salts of these metals.

Our preferred adsorbants preferentially adsorb cholesterol and other sterols, with minimal adsorption of the other lipids. Consequently a substantially cholesterol free lipid mixture can be obtained from the high pressure fluid as it leaves or is otherwise separated from the adsorbant.

In most cases, this will involve passing the high pressure fluid through a column or bed of the adsorbant material, although it is possible to add the adsorbant material in the form of a fine powder to the high pressure fluid, e.g. stirred into a tank and then separating the powder from the fluid by filtration, by a hydro-cyclone, a centrifuge, or other solid/fluid separation technique.

The degree of separation will depend upon the quantity of high pressure fluid used. For example, where a bed or column of the adsorbant material is used, the bed or column of adsorbant can be regenerated by contacting it with a greater quantity of the same high pressure fluid. Alternatively a different fluid which strips off the cholesterol or other sterols more quickly may be used for regeneration. The final stage of the process involves the separation of the purified lipid mixture from the high pressure fluid. Options for achieving this include:

(1) Redeposition in and on a solid matrix, e.g. meat, milk powders or egg powders.

(2) Redeposition on and mixing with the insoluble residues of for example, butter. (3) Collection as is, e.g. in the case of lard or butter.

Process 1 - (FIG. 1) Removal of Cholesterol from a Solid Matrix

Lipids are extracted from a feed material such as finely sliced and at least partly dried meat, by extracting the lipids with a high pressure fluid. The preferred fluid is sub or supercritical carbon dioxide in a preferred pressure range of 150-300 bar, maintained at a temperature within a preferred range of 30°-60° C.

The extracted lipids, mainly fat and cholesterol, dissolved in the high pressure fluid are then passed over a closely packed column of adsorbant material, which is preferably granulated or pelletized with a particle size chosen in order to provide a good flow path through the column, whilst at the same time maximising the surface area of the adsorbant material.

As will be seen from the examples, different basic oxides, hydroxides, carbonates and other oxygen containing salts can be used as the adsorbant material. It is preferred that the column has multiple entry and exit points so that different portions of the bed can be used at different times to adsorb the cholesterol. By suitably separating the different portions of the bed, it is possible to use one portion of the bed whilst another portion is being stripped of its cholesterol.

The flow rate of the high pressure fluid, and the quantity of fat/cholesterol mixture dissolved in the fluid is preferably controlled so that substantially all of the cholesterol is selectively adsorbed on the bed (with minimal adsorption of the fat except where controlled separation of the triglycerides is required) so that the high pressure fluid leaving the bed in most cases consists of substantially all of the fat with complete or almost complete removal of the cholesterol present.

The high pressure fluid leaving the bed, is then processed to separate the fat from the high pressure fluid, and this can be achieved in a variety of ways, e.g. by a increase in temperature, or a decrease in pressure, or a combination of both.

The preferred method involves stripping of the fat from the high pressure fluid by an increase in temperature to a level at which the solubility of the fat in the high pressure fluid is reduced, or becomes negligible. This ranges from 10°-30° C. greater than the extraction temperature for $CO_2$. The fluid remains at high pressure, and is recycled.

Alternatively, the fat can be stripped from the fluid by reducing its pressure. This can if desired be combined with a change in temperature. The pressure can be reduced to atmospheric, with no recycling of the fluid; or the high pressure fluid can have its pressure reduced to the range 50-100 bar and then recycled. In some instances a combination of both processes may be most economical.

As the fat in this case has been removed from a meat product, e.g. beef, the resulting beef tallow can be added back to the meat, during reconstitution of the meat product. Some or all of the fat can be added back in this way, depending upon the fat level required for the resulting meat product. For example, it may be desirable to produce a low fat (cholesterol free) meat product, in which case some of the beef tallow can be removed, and the rest of it redeposited on the meat product.

Process 2 - (FIG. 2) - Cholesterol Free Butter

This process is similar to that of FIG. 1, except that the feed material is butter fat, and is dissolved in a high pressure fluid such as sub or supercritical carbon dioxide. This is then passed over a column of adsorbant material as previously described, so that the cholesterol is selectively adsorbed on the material, and the high pressure fluid leaving the column contains the bulk of the fat, and substantially no cholesterol.

This cholesterol free fat can be separated from the high pressure fluid, preferably by an increase in temperature as previously described, although it is equally possible to separate it by a decrease in pressure. The high pressure fluid is preferably recycled, and used to dissolve further butter fat, which then passes over the adsorbant material and the process continues as shown in the flow chart.

The cholesterol is preferably stripped from the adsorbant material, as described above, to provide a substantially pure form of cholesterol.

In the processes described with reference to FIGS. 1 and 2, it will be appreciated that the adsorbant material is chosen in order to ensure that substantially all of the cholesterol is adsorbed on the bed and the resulting cholesterol free fat is suitable for use as a food product. In order to achieve this, it is preferred that the adsorbant material is physiologically acceptable, and is of relatively low cost, and does not preferentially bind the triacylglycerides, fatty acids, or other naturally occurring food sensitive products: e.g. flavourings, olfactory agents, colouring agents, or the like.

Of the basic oxides, hydroxides, carbonates and other oxygen containing salts tested, we prefer to use the oxides, hydroxides, and carbonates of magnesium and calcium. Although where the high pressure fluid is other than carbon dioxide we prefer to use the corresponding carbonate.

Indeed, the preferred material is calcium carbonate for use with high pressure carbon dioxide, as we have found that by using basic oxides or hydroxides with supercritical carbon dioxide they are converted in the adsorption column into the corresponding carbonate. As calcium carbonate is an inert, low cost, naturally occurring mineral, it is the preferred material for use in this cholesterol/sterol adsorption process.

There are many variations possible for use with the process of this invention, and some of these are described below.

PROCESS OPTIONS

Adsorbents: Basic metal oxides, as well as their hydroxides, carbonates, sulphates, and other oxygen containing salts, are the preferred adsorbant materials. Calcium carbonate, calcium oxide, magnesium carbonate, magnesium oxide and magnesium hydroxide are the most preferred of the naturally occurring adsorbant materials, although other appropriate adsorbants include (but are not limited to) the oxides, hydroxides, carbonates, sulphates, and other oxygen containing salts of magnesium, calcium, strontium, barium, cadmium, cobalt, manganese, nickel, and zinc. They may be used alone or in mixtures, and preferably are used in their naturally occurring form.

Some of these are not suited to a food grade product, although in the separation of sterols, the resulting sterol free fat may not be intended as a food grade product so some or all of these materials could be used.

The properties of the adsorbant material depend on the crystalline structure (and thus the surface structure), and polar nature (acidic or basic). The choice of adsorbant material, will depend upon the design of the plant, the strength of adsorption of the material, and the particle size and strength of the material (in the case of a bed or column) is important to avoid channeling allowing the high pressure fluid to pass through the column without adsorption and it is also desirable to avoid the breakdown of the material into a fine powder which would have the opposite effect of clogging the column. Thus the adsorbants could be provided in pelletized or granular form, or as naturally occurring minerals, or deposited onto suitable substrates such as glass beads or rings.

As we have found that the most suitable materials are the oxides, hydroxides, carbonates, sulphates, and other oxygen containing salts of basic metals, the adsorbant material can be chosen in terms of its relative strength of adsorption. We have found that for a given anion the strongest adsorption of sterols by the oxygen containing salts of the basic metals is shown by magnesium and this decreases through nickel, cadmium, cobalt, zinc, calcium, strontium to barium which shows the least adsorption of this group.

We have found that acidic oxides are not suitable for use with high pressure fluids, as they cause too strong an adsorption of all of the lipid material so that separation is difficult without overloading the adsorbant. Such acidic oxides include Silicic Acid, Florisil, and Alumina, and as such are to be excluded from the process of this invention.

Any fluid which at high pressure (either as a liquid or as a sub or supercritical gas) exhibit solvent properties can be used with this invention.

The following gases have critical properties in the correct range and are unobjectionable from the health point of view: Carbon dioxide, ethane, propane, ethylene, $NO_2$, $SF_6$, $CF_3Cl$, $CF_2CL_2$, $CH_2CF_2$, $C_3F_8$, $CHF_3$ and mixtures thereof, and other gases unobjectionable from a health point of view, and which will be sub or supercritical in temperature and pressure ranges suitable for the processing of foodstuffs.

Entrainers: Subcritical additives which have been shown to enhance the solubility of liquids or cholesterol, include: Propan-2-ol, ethanol, acetone, methanol, ether, ethylene dichloride and ethyl acetate, or other entrainers known in the art may be used to enhance the solubility of the lipids, and especially the solubility of cholesterol or other sterols in the high pressure fluid.

Process conditions (for the preferred solvent $CO_2$ and the preferred adsorbants $MgCO_3$, $MgO$, $CaCl_3$, $CaO$): Pressure: Pressure is in the range 100-400 bar can be used with a preferred range being 150-300 bar.

Temperature: Temperature is in the range 20°-80° C. can be used, with a preferred range being 30°-60° C.

Fat/Adsorbent Ratio: 0.001 g fat/g adsorbant to 0.11 g fat/g adsorbant.

Moisture Content of the Adsorbent material: 0.2% w/w-5.0% w/w, with the preferred moisture content being as low as possible. Similarly, the high pressure carbon dioxide is kept as dry as possible.

Methods of contacting the fluid and the adsorbant: Any suitable method of contacting the two phases can be used, and this is not necessarily limited to the passage of the high pressure fluid through a static column or bed of adsorbant material. For example, the high pressure fluid can pass through a jet through which finely ground adsorbant also passes, or a finely powdered adsorbant material can be introduced into the high pressure fluid and stirred in a reaction vessel, or could be introduced into the high pressure fluid and pumped along with the fluid to be collected at the solvent/solute separation stage whereby the resulting "sludge" of adsorbant material on which the cholesterol is adsorbed can then be removed by appropriate physical processes such as filtration, by using a hydro-cyclone, or possibly by centrifuging. Nevertheless, it is preferred that a fixed bed of particulate or granular adsorbant material is used, in order to avoid abrasive reaction of fine particulate material passing through the plant with the high pressure carbon dioxide.

EXAMPLES

The invention will now be described with reference to experimental examples. In example A cholesterol is separated from butter using a calcium hydroxide adsorbant, and within the limits of experimental error, 100% of the cholesterol was retained in the bed of adsorbant material, and 80% of the triglycerides were recovered. There was no change of colour, and no change to the iodine value of the butter (this is a test traditionally used to check the degree of unsaturation of the butter).

Examples B and C show the separation of cholesterol from spiked lard samples, i.e. samples of lard in which the cholesterol level was artificially increased. In Example D, the separation of cholesterol from butter is combined with the partial fractionation of the triglycerides in order to show that is possible to use this invention to both remove the cholesterol from the butter fat and enhance the concentration of lower molecular weight triglycerides to provide a more spreadable cholesterol free butter without changing any of its other food related characteristics.

In examples A, B and D, magnesium and calcium hydroxides were used as the adsorbant material whereas in example C, calcium carbonate was used. In other examples we have used oxides of calcium and magnesium, as well as the oxide hydroxides, carbonates, sulphates, and other oxygen containing salts of the various basic metals referred to above.

EXAMPLE A

Separation of cholesterol from butter using a calcium hydroxide adsorbant.

| Run No. 197.1 | |
|---|---|
| Adsorbant details: | |
| mass = | 45 g |
| particle size distribution = | 45-125 microns |
| type = | Calcium hydroxide |
| Experimental conditions: | |
| Pressure = | 220 Bar |
| Temperature = | 45° C. |
| Animal fat sample: | |
| sample type = | unsalted butter |
| sample weight = | 0.50 g |
| composition = | 242 mg/100 g cholesterol (wet basis) |
| | 16% moisture |

| Lipid | Bed Retention | Recovery |
|---|---|---|
| Triacylglycerides | 20.0% | 80.0% |
| Cholesterol | 100.0% | 0.0% |

| Comparisons | Feed | Recovered Fat |
|---|---|---|
| Colour | Yellow | Yellow |
| iodine value | 33.0 | 32.1 |

X-ray analysis of the calcium hydroxide as used in example A at the end of a test run revealed that a significant proportion of the bed had been converted to calcite, and subsequent tests with calcium carbonate (Example C) showed that it is a suitable, and indeed, preferred, adsorbant material for use with carbon dioxide.

EXAMPLE B

Separation of cholesterol from a spiked lard sample using Calcium Hydroxide as an adsorbant.

Run No. 193-1
Adsorbant details:

| | |
|---|---|
| Mass = | 40 g |
| Particle size distribution = | 45-125 mm |
| type = | Calcium hydroxide |
| Experimental conditions: | |
| Pressure = | 220 bar |
| Temperature = | 35° C. |
| Animal fat sample: | |
| Sample size = | 0.50 g |
| Sample type = | lard (beef fat) for cooking |
| Composition = | 990.7 mg/100 g ( = 10 × normal level) balance triglycerides. |

| Lipid | Bed Retention | Recovery |
|---|---|---|
| Triacylglycerides | 2.3% | 97.7% |
| Cholesterol | 100.0% | 0.0% |

EXAMPLE C

Separation of cholesterol from a spiked lard sample, using calcium carbonate as an adsorbant.

Run No. 204.1
Adsorbant details:

| | |
|---|---|
| Mass = | 40 g |
| Particle size distribution = | 45-125 mm |
| Type = | Calcium Carbonate |
| Experimental Conditions | |
| Pressure = | 220 bar |
| Temperature = | 45° C. |
| Animal fat sample: | |
| As in run 193.1 (Example B) | |

| Lipid | Bed Retention | Recovery |
|---|---|---|
| Triacylglycerides | 0.0% | 100% |
| Cholesterol | 99.7% | 0.3% |

EXAMPLE D

Separation of cholesterol from butter, and partial fractionation of the triglycerides (by molecular weight) using a magnesium hydroxide adsorbant.

Run no. 189.1
Adsorbant details

| | |
|---|---|
| mass = | 45 g |
| particle size distribution = | 45-125 mm |
| type = | Magnesium Oxide |
| Experimental conditions: | |
| Pressure = | 220 bar |
| Temperature = | 35° C. |
| animal fat sample: | |
| sample type = | unsalted butter |
| sample weight = | 2.04 g |
| composition = | 242 mg/100 g cholesterol (wet basis) 16% moisture |

| Lipid | Bed Retention | Recovery |
|---|---|---|
| Triglycerides | 40.3% | 59.7% |
| Cholesterol | 100% | 0 |

The following concentrations by mass of triglycerides were obtained. (The carbon number, C, excludes carbons in the glyercin chain).

| Carbon No. | Feed Triglycerides | Bed Triglycerides | Recovered Triglycerides |
|---|---|---|---|
| C 34 | 3.96 | 2.90 | 4.64 |
| C 36 | 11.60 | 4.46 | 16.22 |
| C 38 | 17.46 | 6.71 | 24.35 |
| C 40 | 11.87 | 4.13 | 16.83 |
| C 44 | 8.93 | 5.74 | 10.96 |
| C 46 | 9.09 | 10.03 | 8.49 |
| C 48 | 12.71 | 16.69 | 10.17 |
| C 50 | 11.45 | 21.08 | 5.29 |
| C 52 | 12.89 | 28.24 | 3.06 |

The recovered butter fat was considerably enhanced in concentration of lower molecular weight triglycerides, reduced in higher molecular weight triglycerides, and completely cholesterol free. The recovered butter oil also had a lower melting point, thus making it more spreadable at low storage temperatures.

The butter fat obtained was yellow and the ratios of saturated to unsaturated fats was unchanged.

VARIATIONS

Although the above examples concentrated on the separation of cholesterol from butter or lard, it will be appreciated that the invention can be used to separate a wide range of other sterols from lipid rich source material, so that the process of this invention could be used to preferentially concentrate sterols suitable for pharmaceutical use, e.g. the production of hormones, steroids, and the vitamin D series.

The following are examples of other sterols which can be extracted by the process of this invention:
Stigmasterol,
Beta - Sitosterol,
Brassicasterol,
Campesterol,
Spinasterol,
Zymosterol,
Sterols of different varieties found in marine algae, and marine invertebrates,
Autoxidation products of sterols, especially the autoxidation products of cholesterol.
Lanosterol,
Ergosterol,
Vitamin $D_2$ (Calciferol)
Vitamin D (Cholecalciferol)

Related steroids and hormones could also be purified and concentrated using the process of this invention, and for this purpose it is to be understood that the general description "separation of sterols from lipids" is intended to encompass the separation also of steroids and hormones of related structure.

Finally, it will be appreciated that various alterations and modifications may be made to the foregoing without departing from the spirit or the scope of this invention.

We claim:

1. A method of separating sterols from lipids, including:
   (a) dissolving a sterol/lipid mixture in a high pressure physiologically acceptable fluid selected from the group consisting of a high pressure liquid, a high pressure subcritical gas or a high pressure supercritical gas, to form a high pressure fluid mixture,
   (b) contacting the high pressure fluid mixture with an adsorbant material comprising oxygen containing salts of the basic metals to selectively adsorb the sterols on the adsorbant material, and then (c) removing the substantially sterol free lipids from the high pressure fluid.

2. A method as claimed in claim 1 wherein the sterols are selectively removed from the adsorbant material by contacting the adsorbant material with a stripping agent selected from the group consisting of: (i) the high pressure physiologically acceptable fluid as in claim 1 (ii) another high pressure fluid, or (iii) an organic solvent.

3. A method as claimed in claim 2 wherein the oxygen containing salts of the basic metals are selected from the group consisting of oxides, hydroxides, carbonates, sulphates, or phosphates.

4. A method as claimed in claim 3 wherein the adsorbant is selected from the group consisting of the calcium hydroxide, calcium oxide, calcium carbonate, magnesium carbonate, and magnesium hydroxide.

5. A method as claimed in claim 4 wherein the high pressure physiologically acceptable fluid is sub or supercritical carbon dioxide at a pressure in the range 50-400 Bar, and at a temperature in the range 30°-60° C.

6. A method of separating cholesterol from butter fat, including:
(a) dissolving the butter fat in a high pressure physiologically acceptable fluid selected from the group consisting of a high pressure liquid, a high pressure subcritical gas or a high pressure supercritical gas, to form a high pressure fluid mixture,
(b) contacting the high pressure fluid mixture with an adsorbant material, selected from the group consisting of calcium hydroxide, calcium oxide, calcium carbonate, magnesium carbonate and magnesium hydroxide, to selectively adsorb cholesterol on the adsorbant material, and then
(c) recovering the substantially cholesterol free butter fat from the high pressure fluid.

7. A method of separating cholesterol from butter fat as claimed in claim 6 wherein the substantially cholesterol free butter fat is recovered by increasing the temperature and/or reducing the pressure of the high pressure fluid.

* * * * *